United States Patent
Cooke et al.

(10) Patent No.: US 12,335,249 B2
(45) Date of Patent: Jun. 17, 2025

(54) DATA TRANSMISSION SYSTEM, COMMUNICATIONS ADAPTER AND METHOD

(71) Applicant: GOAT Software Limited, Wellington (NZ)

(72) Inventors: George Richmond Cooke, Wellington (NZ); Grant McKeen, Wellington (NZ)

(73) Assignee: GOAT Software Limited, Wellington (NZ)

( * ) Notice: Subject to any disclaimer, the term of this patent is extended or adjusted under 35 U.S.C. 154(b) by 181 days.

(21) Appl. No.: 18/248,851

(22) PCT Filed: Oct. 12, 2021

(86) PCT No.: PCT/NZ2021/050175
§ 371 (c)(1),
(2) Date: Apr. 12, 2023

(87) PCT Pub. No.: WO2022/081025
PCT Pub. Date: Apr. 21, 2022

(65) Prior Publication Data
US 2023/0396600 A1     Dec. 7, 2023

(30) Foreign Application Priority Data

Oct. 12, 2020  (NZ) ........................................ 768814
Oct. 12, 2020  (NZ) ........................................ 768815

(51) Int. Cl.
| | |
|---|---|
| *H04L 9/40* | (2022.01) |
| *H04L 12/18* | (2006.01) |
| *H04L 47/125* | (2022.01) |
| *H04L 69/164* | (2022.01) |

(52) U.S. Cl.
CPC ........ *H04L 63/062* (2013.01); *H04L 12/1868* (2013.01); *H04L 47/125* (2013.01); *H04L 63/065* (2013.01); *H04L 69/164* (2013.01)

(58) Field of Classification Search
CPC . H04L 63/062; H04L 12/1868; H04L 47/125; H04L 63/065; H04L 69/164; H04L 9/0833; H04L 9/3215; H04L 45/125; H04L 45/16; H04L 67/63; H04L 63/0428; H04L 49/201; H04L 69/16; H04L 12/18; H04L 69/326; H04L 49/70; H04W 4/50; H04W 28/08
See application file for complete search history.

(56) References Cited

U.S. PATENT DOCUMENTS

| | | |
|---|---|---|
| 7,617,500 B2 | 11/2009 | Astl et al. |
| 7,644,184 B2 | 1/2010 | Arora et al. |
| 7,650,325 B2 | 1/2010 | Bader et al. |
| 7,881,477 B2 | 2/2011 | Li |
| 8,156,509 B2 | 4/2012 | Lacombe et al. |
| 8,495,594 B2 | 7/2013 | Aupperle et al. |
| 8,842,832 B2 | 9/2014 | Kim et al. |
| 8,856,222 B2 | 10/2014 | McCanne et al. |
| 8,897,301 B2 | 11/2014 | Basso et al. |
| 8,897,452 B2 | 11/2014 | Wu et al. |
| 9,059,936 B2 | 6/2015 | Song et al. |
| 9,430,297 B2 | 8/2016 | Thai et al. |
| 9,471,406 B2 | 10/2016 | Bhattacharyya et al. |
| 9,632,850 B1 | 4/2017 | Emam et al. |
| 9,639,406 B2 | 5/2017 | Aggarwal |
| 10,321,451 B2 | 6/2019 | Sampath et al. |
| 2009/0040959 A1 | 2/2009 | Jung et al. |
| 2018/0007701 A1 | 1/2018 | Adachi et al. |
| 2019/0028929 A1 | 1/2019 | Che |
| 2019/0363989 A1 | 11/2019 | Shalev et al. |
| 2020/0228932 A1 | 7/2020 | Ernst et al. |

FOREIGN PATENT DOCUMENTS

| | | |
|---|---|---|
| EP | 2862339 B1 | 4/2019 |
| JP | 3822466 B2 | 9/2006 |
| WO | 2016066536 A1 | 5/2016 |
| WO | 2022081025 A1 | 4/2022 |

OTHER PUBLICATIONS

Foreign Communication from a Related Counterpart Application, International Search Report and Written Opinion dated Jan. 19, 2022, International Application No. PCT/NZ2021/050175 filed on Oct. 12, 2021.
Foreign Communication from a Related Counterpart Application, International Preliminary Report on Patentability dated Feb. 7, 2023, International Application No. PCT/NZ2021/050175 filed on Oct. 12, 2021.

*Primary Examiner* — Brian Whipple
(74) *Attorney, Agent, or Firm* — Conley Rose, P.C.

(57) ABSTRACT

A method for transmitting data between a sender and at least one receiver in an arranged communications group is described, the method comprising the steps of: arranging the communication group; the sender sending a connection request to the at least one receiver, the connection request including information on the data to be transferred; the sender receiving confirmation of the connection request and a plurality of channels to send the data to; generating a plurality of data packets based on the data to be transmitted and the plurality of channels; sending in parallel the data to the plurality of channels; and receiving confirmation on whether or not the data was received. An apparatus for transmitting data between a sender and at least one receiver is also described.

20 Claims, 4 Drawing Sheets

DATA TRANSMISSION SYSTEM, COMMUNICATIONS ADAPTER AND METHOD

CROSS-REFERENCE TO RELATED APPLICATIONS

The present application is a filing under 35 U.S.C. 371 as the National Stage of International Application No. PCT/NZ2021/050175, filed Oct. 12, 2021, entitled "DATA TRANSMISSION SYSTEM, COMMUNICATIONS ADAPTER AND METHOD," which claims priority to New Zealand Application No. 768814 filed with the Intellectual Property Office of New Zealand on Oct. 12, 2020, and also claims priority to New Zealand Application No. 768815 filed with the Intellectual Property Office of New Zealand on Oct. 12, 2020, all of which are incorporated herein by reference in their entirety for all purposes.

FIELD

This invention relates to a Data Transmission System, Communications Adapter and Method.

BACKGROUND

Data transmission between transmitting and receiving apparatus is not as fast and efficient as is needed.

SUMMARY

According to one example embodiment there is provided a method of transmitting data between a sender and at least one receiver in an arranged communications group comprising the steps of:
 the sender sending a connection request to the at least one receiver, the connection request including information on the data to be transferred;
 the sender receiving confirmation of the connection request and a plurality of channels to send the data to;
 generating a plurality of data packets based on the data to be transmitted and the plurality of channels;
 sending in parallel the data to the plurality of channels; and
 receiving confirmation on whether or not the data was received.

In an embodiment the receivers may be a group of receivers and data may be transmitted using multicast.

In an embodiment the connection request includes a request for secure communication.

In an embodiment secure communication may be negotiated on a per data send/receive request as opposed to a per data packet.

In an embodiment secure communication may be based on a security receive key and the security receive key may be acquired based on receiver group.

In an embodiment, the data may be secured using a public key for the receiver or the receiver group.

In an embodiment, the channels for sending/receiving data packets may be IP ports.

In an embodiment, the protocol for sending data packet(s) to IP ports may be UDP.

In an embodiment, channels can be reused depending on size of the data to be transmitted.

In an embodiment, data packets may be resent by the sender on receipt of a request from the receiver.

In an embodiment, the connection request supports both Unicast and Multicast data transmission.

In an embodiment, the method implements Layer 7 routing, communication, and load balancing within a Layer 4 network.

According to another example embodiment there is provided a data transmission apparatus for transmitting data between a sender and at least one receiver in an arranged communications group comprising:
 a controller;
 a data transmitter capable of sending data to at least one data receiver capable of receiving data;
wherein:
 the data transmitter and the at least one data receiver may be part of the communication group;
 the data transmitter may be configured to send a connection request to at least one data receiver, the connection request including information on the data to be transferred;
 the data transmitter may be configured to receive confirmation of the connection request and a plurality of channels to send the data to;
 the controller may be configured to generate a plurality of data packets based on the data to be transmitted and the plurality of channels;
 the controller may be further configured to send in parallel the data to the plurality of channels; and
 the controller may be further configured to receive confirmation on whether or not the data was received.

In an embodiment, the receivers may be a group of receivers and data may be transmitted using multicast.

In an embodiment, the connection request includes a request for secure communication.

In an embodiment, secure communication may be negotiated on a per data send/receive request as opposed to a per data packet.

In an embodiment, secure communication may be based on a security receive key and the security receive key may be acquired based on receiver group.

In an embodiment, the data may be secured using a public key for the receiver or the receiver group.

In an embodiment, the channels for sending/receiving data packets may be IP ports.

In an embodiment, the protocol for sending data packet(s) to IP ports may be UDP.

In an embodiment, channels can be reused depending on size of the data to be transmitted.

In an embodiment, data packets may be resent by the sender on receipt of a request from the receiver.

In an embodiment, the connection request supports both Unicast and Multicast data transmission.

In an embodiment, the apparatus implements Layer 7 routing, communication, and load balancing within a Layer 4 network.

According to a still further example embodiment there may be provided a method of receiving data at a receiver from a sender, in an arranged communication group comprising the steps of:
 receiving a connection request from a sender, the connection request including information on the data to be transferred;
 opening a plurality of channels based on information on the data to be transferred;
 sending to the sender confirmation of the connection request and a plurality of channels to send the data as data packets to;

receiving the data packets in parallel at the plurality of channels and checking whether the data was received; and sending confirmation that the data was received or a request to resend data packets to one or more channels.

In an embodiment, the data may be transmitted using multicast.

In an embodiment, the connection request includes a request for secure communication.

In an embodiment, secure communication may be negotiated on a per data send/receive request as opposed to a per data packet.

In an embodiment, secure communication may be based on a security receive key and the security receive key may be acquired based on receiver group.

In an embodiment, the data may be secured using a public key for the receiver or the receiver group.

In an embodiment, the channels for sending/receiving data packets may be IP ports.

In an embodiment, the protocol for sending data packet(s) to IP ports may be UDP.

In an embodiment, channels can be reused depending on size of the data to be transmitted.

In an embodiment, data packets may be resent by the sender on receipt of a request from the receiver.

In an embodiment, the connection request supports both Unicast and Multicast data transmission.

In an embodiment, the method implements Layer 7 routing, communication, and load balancing within a Layer 4 network.

A data receiving apparatus for receiving data from a sender in an arranged communications group comprising:
  a controller;
  a data receiver capable of receiving data;
  a data transmitter capable of sending data;
wherein:
  the data receiver and the data sender may be part of the communication group;
  the data receiver may be configured to:
  receive a connection request from a sender, the connection request including information on the data to be transferred; and
  open a plurality of channels based on information on the data to be transferred;
  the data sender may be configured to send to the sender confirmation of the connection request and a plurality of channels to send the data as data packets to;
  the data receiver may be further configured to receive the data packets in parallel at the plurality of channels;
  the controller may be configured to check whether the data was received; and
  the data sender may be configured to send to the controller confirmation that the data was received or a request to resend data packets to one or more channels.

In an embodiment, the data may be transmitted using multicast.

In an embodiment, the connection request includes a request for secure communication.

In an embodiment, secure communication may be negotiated on a per data send/receive request as opposed to a per data packet.

In an embodiment, secure communication may be based on a security receive key and the security receive key may be acquired based on receiver group.

In an embodiment, the data may be secured using a public key for the receiver or the receiver group.

In an embodiment, the channels for sending/receiving data packets may be IP ports.

In an embodiment, the protocol for sending data packet(s) to IP ports may be UDP.

In an embodiment, channels can be reused depending on size of the data to be transmitted.

In an embodiment, data packets may be resent by the sender on receipt of a request from the receiver.

In an embodiment, the connection request supports both Unicast and Multicast data transmission.

In an embodiment, the apparatus implements Layer 7 routing, communication, and load balancing within a Layer 4 network.

According to a yet further example embodiment there may be provided a method of communicating in an arranged communications group comprising the steps of:
  providing a communications interface for each member of the communications group, each member of the communications groups providing at least one service; and
  wherein communications between all of the at least one service hosted on a member of the communications group may be provided by the communications interface and all communications between services hosted on all members of the communications groups may be conducted via the communications interface.

In an embodiment, the communications interface may be a virtual interface.

In an embodiment, the communications interface may be a hardware interface.

In an embodiment, at least one of the at least one service may be an application.

In an embodiment, at least one of the at least one service may be a data store.

In an embodiment, at least one member of the communications group may be a server.

According to a still yet further example embodiment there is provided a data transmission apparatus configured for use in an arranged communication group, the data transmission apparatus associated with one member of the communications group, each member of the communications groups providing at least one service, the data transmission apparatus comprising:
  a controller;
  a data transmitter configured to send data to at least one data receiver capable of receiving data;
  a data receiver configured to receive data from at least one data transmitter capable of sending data; and
  at least one service communication interface, the at least one service communication interface communicating with each at least one service provided by the member.

In an embodiment, the data transmission apparatus may be a virtual apparatus.

In an embodiment, the data transmission apparatus may be a hardware apparatus.

In an embodiment, at least one of the at least one service may be an application.

In an embodiment, at least one of the at least one service may be a data store.

In an embodiment, the one member may be a server.

According to another example embodiment there is provided a method of transmitting data between a sender and at least one receiver in an arranged communications group comprising the steps of:
  the sender sending a connection request to the at least one receiver, the connection request including information on the data to be transferred.

the sender receiving confirmation of the connection request and a plurality of channels to send the data to;
generating a plurality of data packets based on the data to be transmitted and the plurality of channels;
sending in parallel the data to the plurality of channels; and
receiving confirmation on whether or not the data was received.

In an embodiment, the receivers may be a group of receivers and data may be transmitted using multicast.

In an embodiment, the connection request includes a request for secure communication.

In an embodiment, secure communication may be negotiated on a per data send/receive request as opposed to a per data packet.

In an embodiment, secure communication may be based on a security receive key and the security receive key may be acquired based on receiver group.

In an embodiment, the channels for sending/receiving data packets may be IP ports.

In an embodiment, the protocol for sending data packet(s) to IP ports may be UDP.

In an embodiment, channels can be reused depending on size of the data to be transmitted.

In an embodiment, data packets may be resent by the sender on receipt of a request from the receiver.

In an embodiment, the connection request supports both Unicast and Multicast data transmission.

In an embodiment, the method implements Layer 7 routing, communication, and load balancing within a Layer 4 network.

According to another example embodiment there may be provided a data transmission apparatus for transmitting data between a sender and at least one receiver in an arranged communications group comprising:
a controller;
a data transmitter capable of sending data to at least one data receiver capable of receiving data;
wherein:
the data transmitter and the at least one data receiver may be part of the communication group;
the data transmitter may be configured to send a connection request to at least one data receiver, the connection request including information on the data to be transferred;
the data transmitter may be configured to receive confirmation of the connection request and a plurality of channels to send the data to;
the controller may be configured to generate a plurality of data packets based on the data to be transmitted and the plurality of channels;
the controller may be further configured to send in parallel the data to the plurality of channels; and
the controller may be further configured to receive confirmation on whether or not the data was received.

In an embodiment, the receivers may be a group of receivers and data may be transmitted using multicast.

In an embodiment, the connection request includes a request for secure communication.

In an embodiment, secure communication may be negotiated on a per data send/receive request as opposed to a per data packet.

In an embodiment, secure communication may be based on a security receive key and the security receive key may be acquired based on receiver group.

In an embodiment, the data may be secured using a public key for the receiver or the receiver group.

In an embodiment, the channels for sending/receiving data packets may be IP ports.

In an embodiment, the protocol for sending data packet(s) to IP ports may be UDP.

In an embodiment, channels can be reused depending on size of the data to be transmitted.

In an embodiment, data packets may be resent by the sender on receipt of a request from the receiver.

In an embodiment, the connection request supports both Unicast and Multicast data transmission.

In an embodiment, the apparatus implements Layer 7 routing, communication, and load balancing within a Layer 4 network.

According to a still further example embodiment there is provided a method of receiving data at a receiver from a sender, in an arranged communication group comprising the steps of:
receiving a connection request from a sender, the connection request including information on the data to be transferred;
opening a plurality of channels based on information on the data to be transferred;
sending to the sender confirmation of the connection request and a plurality of channels to send the data as data packets to;
receiving the data packets in parallel at the plurality of channels and checking whether the data was received; and
sending confirmation that the data was received or a request to resend data packets to one or more channels.

In an embodiment, the data may be transmitted using multicast.

In an embodiment, the connection request includes a request for secure communication.

In an embodiment, secure communication may be negotiated on a per data send/receive request as opposed to a per data packet.

In an embodiment, secure communication may be based on a security receive key and the security receive key may be acquired based on receiver group.

In an embodiment, the data may be secured using a public key for the receiver or the receiver group.

In an embodiment, the channels for sending/receiving data packets may be IP ports.

In an embodiment, the protocol for sending data packet(s) to IP ports may be UDP.

In an embodiment, channels can be reused depending on size of the data to be transmitted.

In an embodiment, data packets may be resent by the sender on receipt of a request from the receiver.

In an embodiment, the connection request supports both Unicast and Multicast data transmission.

In an embodiment, the method implements Layer 7 routing, communication, and load balancing within a Layer 4 network.

A data receiving apparatus for receiving data from a sender in an arranged communications group comprising:
a controller;
a data receiver capable of receiving data;
a data transmitter capable of sending data;
wherein:
the data receiver and the data sender may be part of the communication group;
the data receiver may be configured to:
receive a connection request from a sender, the connection request including information on the data to be transferred; and open a plurality of channels based on information on the data to be transferred;

the data sender may be configured to send to the sender confirmation of the connection request and a plurality of channels to send the data as data packets to;

the data receiver may be further configured to receive the data packets in parallel at the plurality of channels;

the controller may be configured to check whether the data was received;

and the data receiver may be configured to send to the sender confirmation that the data was received or a request to resend data packets to one or more channels.

In an embodiment, the data may be transmitted using multicast.

In an embodiment, the connection request includes a request for secure communication.

In an embodiment, secure communication may be negotiated on a per data send/receive request as opposed to a per data packet.

In an embodiment, secure communication may be based on a security receive key and the security receive key may be acquired based on receiver group.

In an embodiment, the data may be secured using a public key for the receiver or the receiver group.

In an embodiment, the channels for sending/receiving data packets may be IP ports.

In an embodiment, the protocol for sending data packet(s) to IP ports may be UDP.

In an embodiment, channels can be reused depending on size of the data to be transmitted.

In an embodiment, data packets may be resent by the sender on receipt of a request from the receiver.

In an embodiment, the connection request supports both Unicast and Multicast data transmission.

In an embodiment, the apparatus implements Layer 7 routing, communication, and load balancing within a Layer 4 network.

Interpretation

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which.

DETAILED DESCRIPTION

Figure 1:
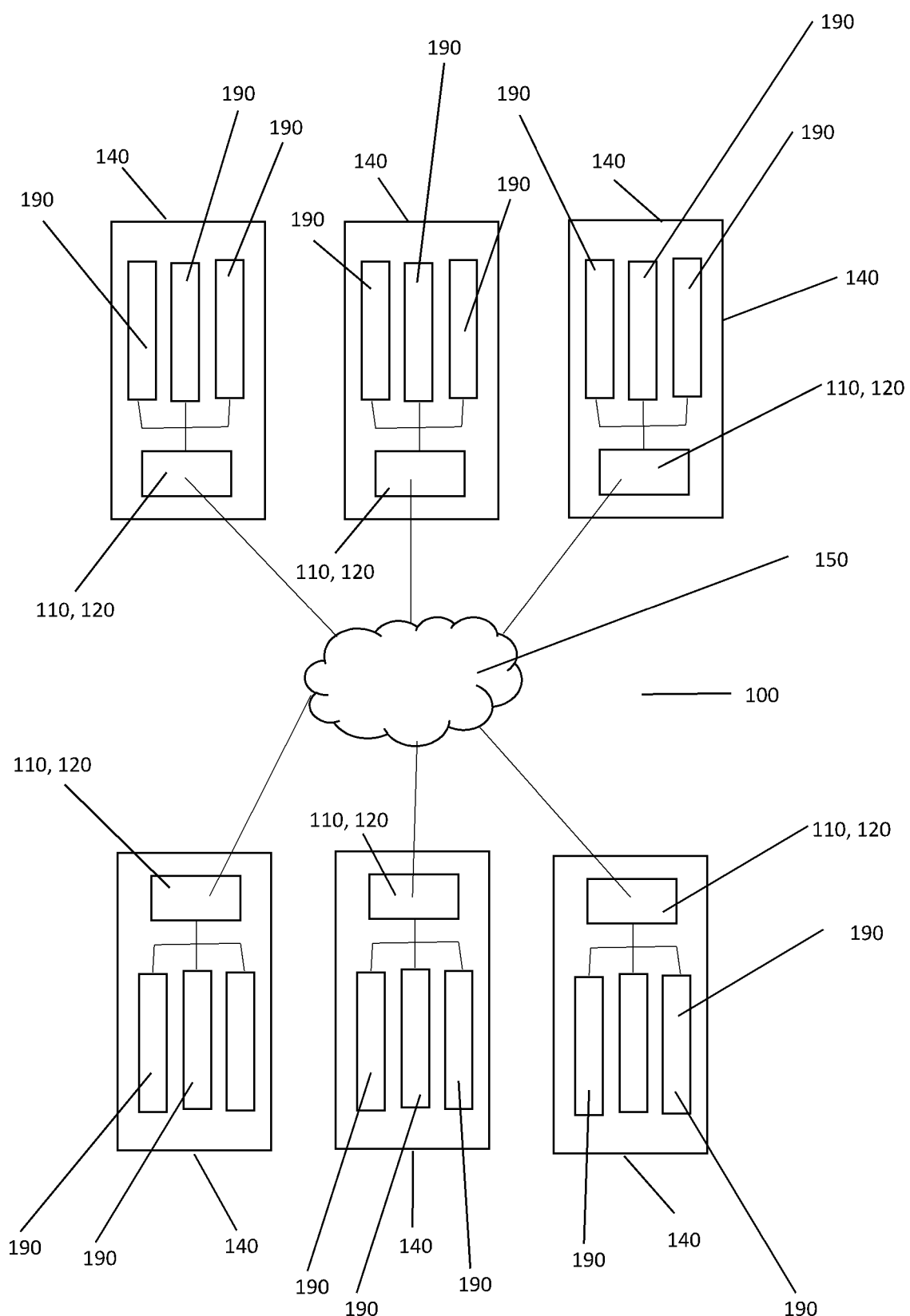
FIG. 1 is a schematic diagram of the transmitting and receiving system for parallel transmission of data according to an example embodiment.

FIG. 1 illustrates the transmitting and receiving system 100 for parallel transmission of data according to an example embodiment. The transmitting and receiving system 100 in one example embodiment implements Layer 7 routing, communication and load balancing within a Layer 4 network.

A plurality of devices 110, 120 are arranged into a communications group. The devices are both receiving 110 and sending 120 devices connected via a network 150. The devices can be containers or virtualised container, servers or virtual servers or a software communications apparatus implemented as a driver. The devices may also be hardware devices for performing a particular task, including a router, firewall or intelligent switch. Further the devices can be daughter cards for installation in computers. The device 110, 120 acts as an adapter to allow communications between applications 190 running on a computing device 140 and applications 190 running on other computing devices 140. A single adapter 110, 120 is provided per computing device 140. Communication between all the applications running on each computing devices 140 and between the multiple computing devices is carried out via the adapters 110, 120.

To instigate sending data the sender device 110 sends a connection request to at least one receiving device. Typically, the connection request would include information on the data the sender 110 wishes to transfer.

When the receiver 110 receives the request the receiver 120 sends to the sender 120 confirmation of the connection request and a plurality of channels to send the data to.

The channels for sending and receiving data packets in one example are IP ports. The protocol for sending data packet(s) to the IP ports in one example UDP however other protocols can be used.

Upon receipt of the confirmation and channels the sender 120 generates a number of data packets based on the data to be transmitted and the number of channels advised by the receiver 110. The sender then sends the data in parallel to the plurality of channels. The channels can be reused depending on size of the data to be transmitted. The receiver 110 confirms with the sender 120 by sending confirmation on whether the data was received. Data packets can be resent by the sender 120 on receipt of a request from the receiver 110.

There can be multiple receivers receiving the data at once. If there are multiple receivers the data can be transmitted using multicast or unicast. If the data is being set to multiple receivers, then the resent data can be multicast to all receivers with information confirming that the data is resent data.

The connection request may include a request for secure communication. In one example embodiment secure communication is negotiated on a per data send/receive request as opposed to a per data packet.

Secure communication in one example embodiment can be based on a security receive key. The security receive key being based on the communications group public key.

The communication group public key is managed by a group key manager (GKM), and the trust between the sender and the GKM, as well as the receiver and the GKM, are based on a local certificate authority (CA). The communication group member can retrieve a group key from the GKM, and the sender is able to retrieve the public group key from the GKM, and that public key being used to encrypt the data. The communication group member can decrypt the data received with the group key (private key).

The GKM is responsible for:
assigning new key for registration of new group member;
generate/send the group key to the at least one trusted communication group member;
de-registration of a current group member;
invoking the communication group key and trigger a re-key operation for that communication group; and
group key re-key—regenerate/send the group key to at least one trusted communication group member.

Figure 2:
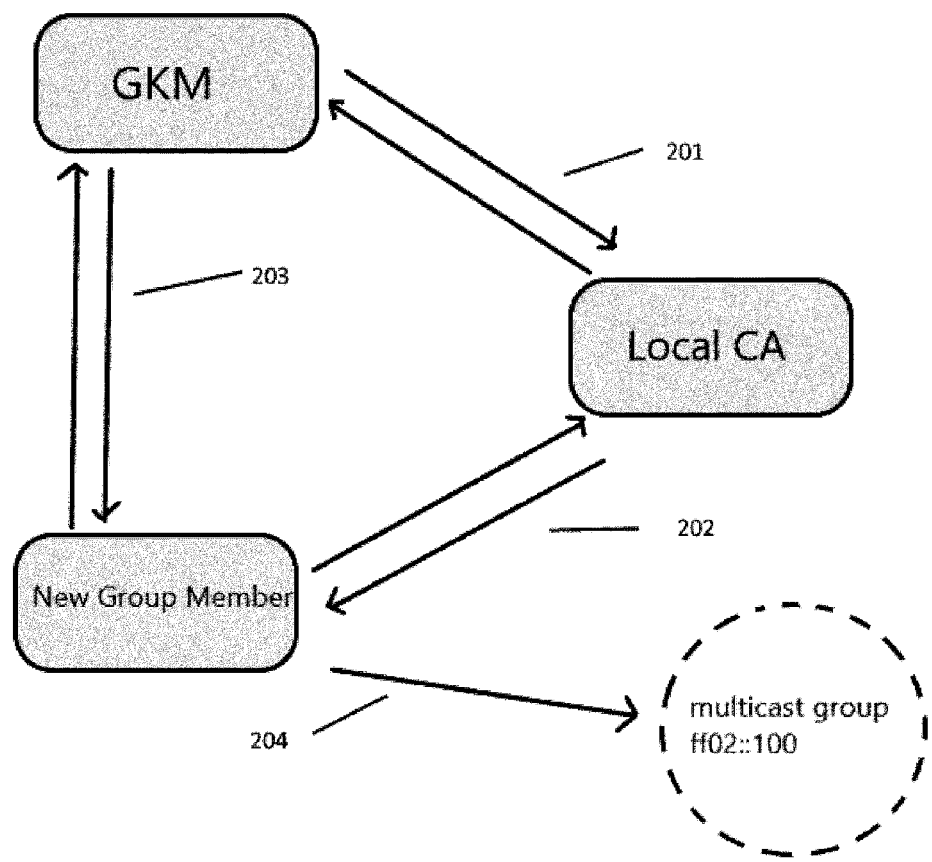
FIG. 2 is a schematic diagram of the registration of a group member according to an example embodiment.
Figure 3:
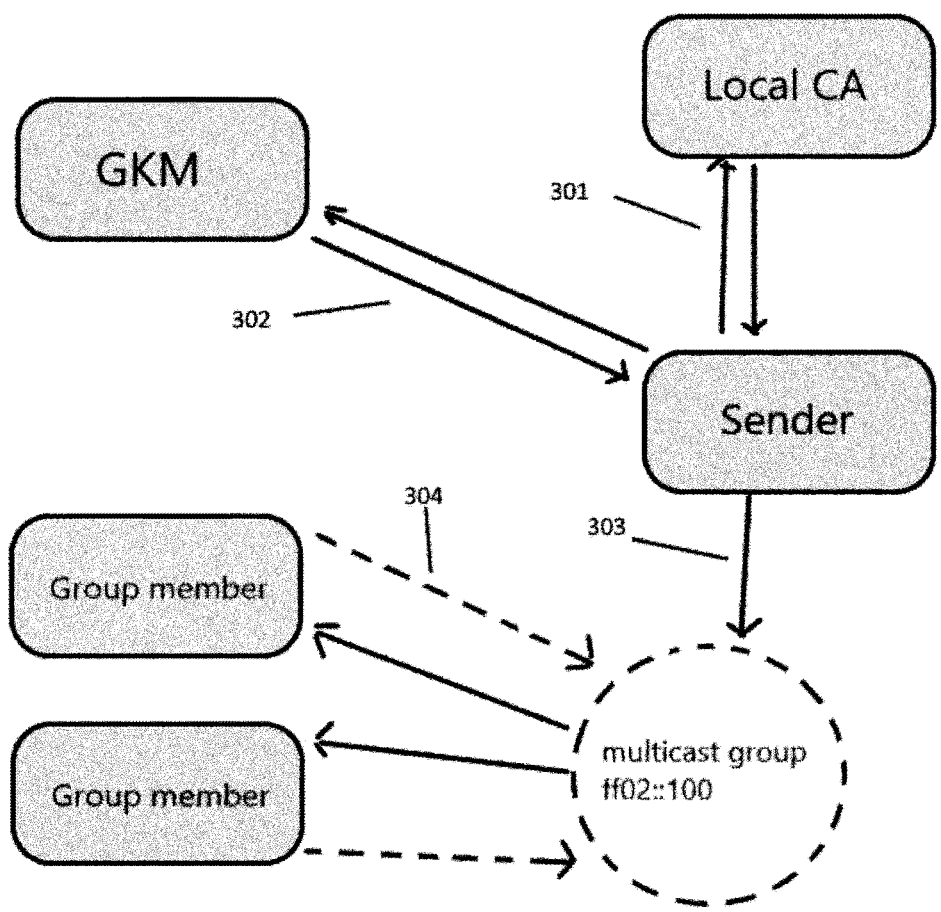
FIG. 3 is a schematic diagram of the data sending process according to an example embodiment.

Referring to FIGS. 2 and 3, multicast security can be achieved using regulated group keys, that is, a Group Key Manager (GKM) is responsible for the registration of new group member/de-registration of current group member, distributing group keys to trusted nodes and sending rekey message to the group that has an expired/invalid group key.

The registration process is illustrated in FIG. 2, the Group Key Manager (GKM) requests 201 the local Certification Authority (CA) to sign its certificate. The new group member also requests 202 the local CA to sign its certificate. Both new group member and GKM trust the local CA, so they can establish a mutual TLS connection. The new group member sends a request 203 to GKM to join a specific multicast group, then the GKM sends the group key belongs to that multicast group back to the new group member. The new group member listen to the multicast group address and ready to receive data. The CA and GKM may be the same server/device or may be separate servers/devices as illustrated.

The data sending process is illustrated in FIG. 3, the sender retrieves 301 a signed certificate from the local CA. be sender also retrieves 302 a group's public key from GKM. This allows the sender to encrypt data with the group's public key and send 303 encrypted data to the multicast group address. The data is to be sent and received in a parallel way. All group member that listen 304 to the multicast group address will receive data, and the data can be decrypted with the group key.

Figure 4:
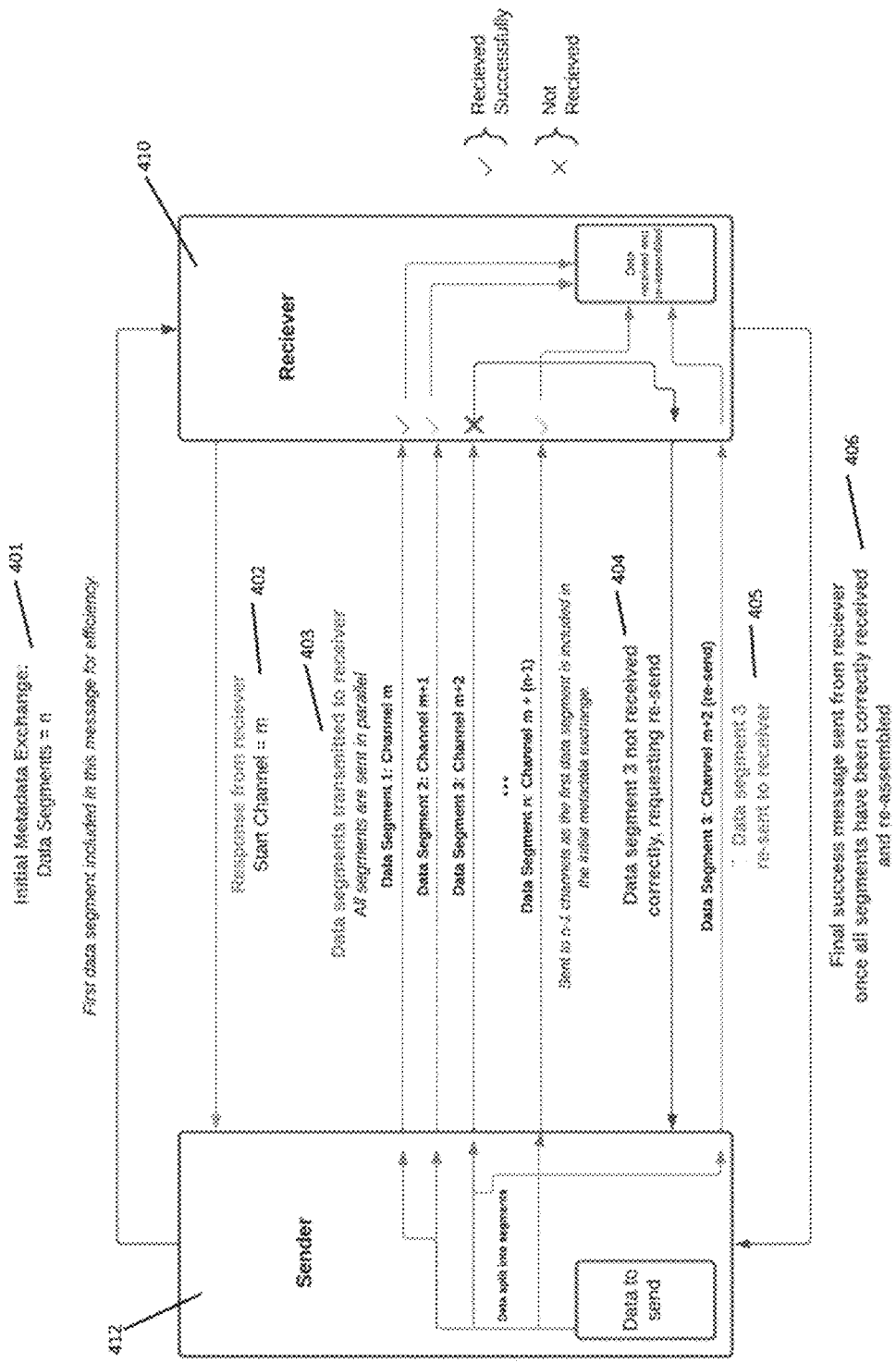
FIG. 4 is a schematic diagram of the data transmission method and apparatus according to an example embodiment.

Referring to FIG. 4 an example of transmitting data between a sender 412 and a receiver 410 is illustrated. An initial metadata exchange 401 is send from the sender 412. The receiver 410 responds with channel information including the start channel. The data to be send is split into segments by the sender 412 and transmitted 403 to the receiver 410. In the event that the receiver 410 does not receive all packets the receiver 410 send a request 404 to resend packets. The sender 412 resends 405 the packets, the steps of requesting 404 a resend and resending 405 the packets continues until the receiver 410 has all the packets. Once the receiver has all the packets the receiver sends 406 a success message.

In an example embodiment transmitting data between a sender and at least one receiver in an arranged communications group comprises the sender sending a connection request to the at least one receiver, the connection request including information on the data to be transferred. The initial sender request includes metadata relating to the type and size of the data and will also contain the first segment of data to be transmitted. This is separate to the data transfer (when the data transfer requires more than one segment).

The sender then receives confirmation of the connection request and a plurality of channels to send the data to. Receiver replies with confirmation and may, when using multiple IP ports, reply with a "start" port denoting which port the split data will begin from. Subsequent ports used will be contiguous with the start port to retain the correct order of data pieces. Alternatively, the sender can add a sequence number to each data channel transmission, in which case the receiver will read this sequence number and reorder the data itself.

The sender then generates a plurality of data packets based on the data to be transmitted and the plurality of channels. Each channel will send up to the maximum UDP packet size (65 KB (or whatever the max packet size is for the chosen protocol), hence, the data to be sent will be separated into blocks of this max packet size plus a remainder packet. Since the initial metadata exchange packet contains the first segment of data, when the data packet is smaller than the max packet size only one packet is required to be sent from the sender for efficiency.

Having generated the packets, the sender sends in parallel the data to the plurality of channels. Channels are aligned with the "start" port given by the receiver in response to the initial metadata transmission. If the data segments are ordered by the inclusion of a sequence number as previously detailed, this port alignment is not required.

The sender waits for confirmation on whether the data was received. Confirmation is sent by the receiver if all channels received data correctly and each data segment was successfully recombined into the original data sent. If a failure was detected on any channel/port, the receiver will respond with a retransmit request with the unique channel ID(s) for the unsuccessful channel(s). The sender will then resend the data for these channels only. This process repeats until all the data has been received successfully.

The receivers are a group of receivers and data is transmitted using multicast. managed multicast (unicast). If the network apparatus does not support multicast or it's configured to use managed multicast (unicast).

The connection request from the receiver may include a request for secure communication. The connection request includes the information of whether the data is encrypted, and the encryption method to be used.

The secure communication is negotiated on a per data send/receive request as opposed to a per data packet. The data transmitter encrypts the data before split the data into segments, the data receiver recombines all the data segments into the original data sent before attempting to decrypt the data.

The data is secured using a public key for the receiver or the receiver group. Data to be sent is encrypted with the public group key of the receiver or the receiver group, encrypted data is decrypted with the group key (private key).

The secure communication is based on a security receive key and the security receive key is acquired based on receiver group. Multicast security is achieved with regulated group keys, the group members from the same communication group have a group key assigned. A trusted data transmitter (holds a trusted signed certificate) and can get the public group key to encrypt the data. The data receiver can decrypt the received data with the group key (private key).

The channels for sending/receiving data packets are IP ports. The channels are opened and configured only once upon system start-up and reused throughout the lifetime of the system (i.e., until the system is shut down).

The preferred protocol for sending data packet(s) to IP ports is UDP and channels can be reused depending on size of the data to be transmitted. Data packets are resent by the sender on receipt of a request from the receiver. This retransmission process will continue until the data is successfully received.

The connection request may support both Unicast and Multicast data transmission. Managed multicast (unicast)

can be used if the network apparatus does not support multicast or is configured to use managed multicast (unicast).

The method implements Layer 7 routing, communication, and load balancing within a Layer 4 network. Data packets are sent with using UDP protocol (layer 4) to reduce the network overhead of the layer7 protocols.

In another example embodiment a data transmission apparatus for transmitting data between a sender and at least one receiver in an arranged communications group is used. The apparatus comprises a controller and a data transmitter capable of sending data to at least one data receiver capable of receiving data.

The data transmitter and the at least one data receiver are part of the communication group. The data transmitter sends a connection request to at least one data receiver, the connection request including information on the data to be transferred. The data transmitter receives confirmation of the connection request and a plurality of channels to send the data to. The controller then generates a plurality of data packets based on the data to be transmitted and the plurality of channels. The controller sends in parallel the data to the plurality of channels and waits to receive confirmation on whether the data was received.

The receivers can be a group of receivers and data can be transmitted using multicast. Managed multicast (unicast) can be used if the network apparatus does not support multicast or if the network apparatus is configured to use managed multicast (unicast).

The connection request can include a request for secure communication. The connection request may include information on whether the data is encrypted, and the encryption method is used.

Secure communication can be negotiated on a per data send/receive request as opposed to a per data packet. The data transmitter encrypts the data before splitting the data into segments, the data receiver recombined all the data segments into the original data sent before attempting to decrypt the data.

The data can be secured using a public key for the receiver or the receiver group. Data to be sent is encrypted with the public group key of the receiver or the receiver group, encrypted data is decrypted with the group key (private key).

Secure communication is based on a security receive key and the security receive key is acquired based on receiver group. Multicast security is achieved with regulated group keys, the group members from the same communication group have a group key assigned. A trusted data transmitter (holds a trusted signed certificate) can get the public group key to encrypt the data. The data receiver can decrypt the received data with the group key (private key).

The channels for sending/receiving data packets can be IP ports. The channels can be opened and configured only once upon system start-up and reused throughout the lifetime of the system (i.e., until the system is shut down). The protocol for sending data packet(s) to IP ports can be UDP. Channels can be reused depending on size of the data to be transmitted. Packets are resent by the sender on receipt of a request from the receiver. This retransmission process will continue until the data is successfully received.

Connection request support both Unicast and Multicast data transmission. Managed multicast (unicast) will be used if the network apparatus does not support multicast, or it's configured to use managed multicast (unicast). The apparatus implements Layer 7 routing, communication, and load balancing within a Layer 4 network. Data packets are sent with using UDP protocol (layer 4) to reduce the network overhead of the layer7 protocols.

In a further example embodiment, there is provided a method of receiving data at a receiver from a sender, in an arranged communication group. The receiver receives a connection request from a sender, the connection request including information on the data to be transferred. In response the receiver opens a plurality of channels based on information on the data to be transferred and send to the sender confirmation of the connection request and a plurality of channels to send the data as data packets to. The receiver then receives the data packets in parallel at the plurality of channels and checks whether the data was received. The receiver then send confirmation that the data was received or a request to resend data packets to one or more channels.

The data can be transmitted using multicast. Managed multicast (unicast) is used if the network apparatus does not support multicast or if the network apparatus is configured to use managed multicast (unicast). The connection request may include a request for secure communication. The connection request includes the information of whether the data is encrypted, and the encryption method is used.

Secure communication can be negotiated on a per data send/receive request as opposed to a per data packet. The data sender encrypts the data before split the data into segments, the data receiver recombined all the data segments into the original data sent before attempting to decrypt the data.

The data can be secured using a public key for the receiver or the receiver group. Data to be sent can be encrypted with the public group key of the receiver or the receiver group, encrypted data is decrypted with the group key (private key).

Secure communication can be based on a security receive key and the security receive key is acquired based on receiver group. Multicast security is achieved with regulated group keys, the group members from the same communication group have a group key assigned. A trusted data transmitter (holds a trusted signed certificate) can get the public group key to encrypt the data. The data receiver can decrypt the received data with the group key (private key).

The channels for sending/receiving data packets are IP ports. Channels are opened and configured only once upon system start-up and reused throughout the lifetime of the system (i.e., until the system is shut down). The protocol for sending data packet(s) to IP ports is UDP. The channels can be reused depending on size of the data to be transmitted.

Data packets are resent by the sender on receipt of a request from the receiver. This retransmission process will continue until the data is successfully received.

The connection request may support both Unicast and Multicast data transmission. Managed multicast (unicast) can be used if the network apparatus does not support multicast, or it's configured to use managed multicast (unicast).

The method implements Layer 7 routing, communication, and load balancing within a Layer 4 network. Data packets are sent with UDP protocol (layer 4) to reduce the network overhead of the layer7 protocols.

In another example embodiment a data receiving apparatus for receiving data from a sender in an arranged communications group is implemented. The apparatus comprises a controller, a data receiver capable of receiving data, and a data transmitter capable of sending data.

The data receiver and the data sender are part of the communication group. The data receiver receives a connection request from a sender, the connection request including information on the data to be transferred. The data receiver opens a plurality of channels based on information on the data to be transferred. The data sender sends to the sender confirmation of the connection request and a plurality of channels to send the data as data packets to. The data receiver receives the data packets in parallel at the plurality of channels.

The data receiver checks whether the data was received and sends to the data sender confirmation that the data was received or a request to resend data packets to one or more channels.

The data can be transmitted using multicast. Managed multicast (unicast) is used if the network apparatus does not support multicast or if the network apparatus is configured to use managed multicast (unicast).

The connection request may include a request for secure communication. The connection request may include information of whether the data is to be encrypted, and the encryption method to be used.

Secure communication is negotiated on a per data send/receive request as opposed to a per data packet. The data transmitter encrypts the data before split the data into segments, the data receiver recombines all the data segments into the original data sent before attempting to decrypt the data.

Secure communication is based on a security receive key and the security receive key is acquired based on receiver group. Multicast security is achieved with regulated group keys, the group members from the same communication group have a group key assigned. A trusted data transmitter (holds a trusted signed certificate) can get the public group key to encrypt the data. The data receiver can decrypt the received data with the group key (private key).

The data can be secured using a public key for the receiver or the receiver group. data to be sent is encrypted with the public group key of the receiver or the receiver group, encrypted data is decrypted with the group key (private key).

Channels for sending/receiving data packets are IP ports. The channels are opened and configured only once upon system start-up and reused throughout the lifetime of the system (i.e., until the system is shut down). The protocol for sending data packet(s) to IP ports can be UDP. Channels can be reused depending on size of the data to be transmitted.

Data packets are resent by the sender on receipt of a request from the receiver. This retransmission process will continue until the data is successfully received.

Connection request may support both Unicast and Multicast data transmission. Managed multicast (unicast) can be used if the network apparatus does not support multicast or if configured to use managed multicast (unicast). The apparatus implements Layer 7 routing, communication, and load balancing within a Layer 4 network to reduce the network overhead of the layer7 protocols.

In another embodiment a method of communicating in an arranged communications group is provided. The method provides a communications interface for each member of a communications group. Each member of the communications groups provides at least one service. Communications between all the at least one service hosted on a member of the communications group is provide by the communications interface and all communications between services hosted on all members of the communications groups is conducted via the communications interface. The communications interface can be a virtual interface. Alternatively, the communications interface can be a hardware interface. The service can be an application and can be a data store. The at least member of the communications group may server.

In another example embodiment a data transmission apparatus for use in an arranged communication group is used. The data transmission apparatus is associated with one member of the communications group. Each member of the communications groups providing at least one service. The data transmission apparatus comprises a controller and a data transmitter configured to send data to at least one data receiver capable of receiving data. The data receiver receives data from at least one data transmitter capable of sending data and has at least one service communication interface, the at least one service communication interface communicating with each at least one service provided by the data receiver.

The data transmission apparatus can be a virtual apparatus, alternately the data transmission apparatus can be a hardware apparatus. The service can be an application or a data store. The member can be a server.

In another example embodiment there is a method of transmitting data between a sender and at least one receiver in an arranged communications group. A sender sends a connection request to the at least one receiver, the connection request including information on the data to be transferred. The initial sender request includes metadata relating to the type and size of the data and contains the first segment of data to be transmitted. This is separate to the data transfer (when the data transfer requires more than one segment). The receiver replies with confirmation and optionally, when using multiple IP ports, a "start" port denoting which port the split data will begin from. Subsequent ports used will be contiguous with the start port to retain the correct order of data pieces. Alternatively, the sender can add a sequence number to each data channel transmission, in which case the receiver will read this sequence number and reorder the data itself.

The sender then generates a plurality of data packets based on the data to be transmitted and the plurality of channels. Each channel will send up to the maximum UDP packet size (65 KB (or whatever the max packet size is for the chosen protocol), hence, the data to be sent will be separated into blocks of this max packet size plus a remainder packet. Since the initial metadata exchange packet contains the first segment of data, when the data packet is smaller than the max packet size only one packet is required to be sent from the sender for efficiency. The sender then sends in parallel the data to the plurality of channels; Channels are aligned with the "start" port given by the receiver in response to the initial metadata transmission. If the data segments are ordered by the inclusion of a sequence number as previously detailed, this port alignment is not required.

The sender will receive confirmation on whether the data was received. Confirmation is sent by the receiver if all channels received data correctly and each data segment was successfully recombined into the original data sent. If a failure was detected on any channel, the receiver will respond with a retransmit request with the unique channel ID(s) for the unsuccessful channel(s). The sender will then resend the data for these channels only. This process repeats until all the data has been received successfully. If all data is not received the sender will retransmit the data segment(s) on the channel(s) as detailed by the receiver.

The receivers are a group of receivers and data is transmitted using multicast. Managed multicast (unicast) will be used if the network apparatus does not support multicast, or it's configured to use managed multicast (unicast). Alternatively, a multicast-like transmission method can be used.

The connection request may include a request for secure communication whether the data is encrypted, and the encryption method to be used. Secure communication can be negotiated on a per data send/receive request as opposed to a per data packet. The data sender encrypts the data before splitting the data into segments, the data receiver recombines all the data segments into the original data sent before attempting to decrypt the data.

The data can be secured using a public key for the receiver or the receiver group. Data to be sent can be encrypted with the public group key of the receiver or the receiver group, encrypted data is decrypted with the group key (private key).

Secure communication is based on a security receive key and the security receive key is acquired based on receiver group. Multicast security is achieved with regulated group keys, the group members from the same communication group have a group key assigned. The trusted data transmitter (holds a trusted signed certificate) can get the public group key to encrypt the data as a whole and the data receiver is able to decrypt the received data with the group key (private key).

The channels for sending/receiving data packets can be IP ports. The channels can be opened and configured only once upon system start-up and reused throughout the lifetime of the system (i.e., until the system is shut down). The protocol for sending data packet(s) to IP ports is in one embodiment UDP. Channels can be reused depending on size of the data to be transmitted.

Data packets van be resent by the sender on receipt of a request from the receiver. This retransmission process will continue until the data is successfully received.

Connection requests may support both Unicast and Multicast data transmission. Managed multicast (unicast) can be used if the network apparatus does not support multicast, or it's configured to use managed multicast (unicast).

The method implements Layer 7 routing, communication, and load balancing within a Layer 4 network. Data packets are sent with UDP protocol (layer 4) to reduce the network overhead of the layer7 protocols.

In another example embodiment a data transmission apparatus for transmitting data between a sender and at least one receiver in an arranged communications group comprising is used. The data transmission apparatus comprises a controller a data transmitter capable of sending data to at least one data receiver capable of receiving data. The data transmitter and the at least one data receiver can be part of the communication group. The data transmitter is configured to send a connection request to at least one data receiver, the connection request including information on the data to be transferred. The data transmitter is configured to receive confirmation of the connection request and a plurality of channels to send the data to. The controller is configured to generate a plurality of data packets based on the data to be transmitted and the plurality of channels. The controller is further configured to send in parallel the data to the plurality of channels and to receive confirmation on whether the data was received.

The receivers are a group of receivers and data is transmitted using multicast. Managed multicast (unicast) will be using if the network apparatus does not support multicast, or it's configured to use managed multicast (unicast).

The connection may include a request for secure communication. The connection request includes the information of whether the data is encrypted, and the encryption method is used.

Secure communication can be negotiated on a per data send/receive request as opposed to a per data packet. The data transmitter encrypts the data before splitting the data into segments, the data receiver recombined all the data segments into the original data sent before attempting to decrypt the data.

Secure communication can be based on a security receive key and the security receive key is acquired based on receiver group. Multicast security is achieved with regulated group keys, the group members from the same communication group have a group key assigned. A trusted data transmitter (holds a trusted signed certificate) can get the public group key to encrypt the data. And the data receiver can decrypt the received data with the group key (private key).

Data can be secured using a public key for the receiver or the receiver group. data to be sent is encrypted with the public group key of the receiver or the receiver group, encrypted data is decrypted with the group key (private key).

Channels for sending/receiving data packets can be IP ports. The channels can be opened and configured only once upon system start-up and reused throughout the lifetime of the system (i.e., until the system is shut down).

The protocol for sending data packet(s) to IP ports can be UDP. Channels can be reused depending on size of the data to be transmitted. Data packets can be resent by the sender on receipt of a request from the receiver. This retransmission process will continue until the data is successfully received.

The connection request can support both Unicast and Multicast data transmission. Managed multicast (unicast) can be used if the network apparatus does not support multicast, or it's configured to use managed multicast (unicast). The apparatus implements Layer 7 routing, communication, and load balancing within a Layer 4 network.

In another example embodiment there is a method of receiving data at a receiver from a sender, in an arranged communication group. The method comprises receiving a connection request from a sender, the connection request including information on the data to be transferred. The method further comprises opening a plurality of channels based on information on the data to be transferred, sending to the sender confirmation of the connection request and a plurality of channels to send the data as data packets to, receiving the data packets in parallel at the plurality of channels and checking whether the data was received, and sending confirmation that the data was received or a request to resend data packets to one or more channels.

The data can be transmitted using multicast. The connection request can include a request for secure communication. The connection request can include the information of whether the data is encrypted, and the encryption method to be used. Secure communication can be negotiated on a per data send/receive request as opposed to a per data packet. The data transmitter can encrypt the data before splitting the data into segments, the data receiver then recombines all the data segments into the original data sent before attempting to decrypt the data.

Secure communication can be based on a security receive key and the security receive key can be acquired based on receiver group. Multicast security can be achieved with regulated group keys, the group members from the same communication group having a group key assigned. A trusted data transmitter (holds a trusted signed certificate) can get the public group key to encrypt the data. The data receiver can decrypt the received data with the group key (private key).

Data can be secured using a public key for the receiver or the receiver group. data to be sent can be encrypted with the public group key of the receiver or the receiver group, encrypted data is decrypted with the group key (private key).

Channels for sending/receiving data packets can be IP ports. The channels can be opened and configured only once upon system start-up and can be reused throughout the lifetime of the system (i.e., until the system is shut down). The protocol for sending data packet(s) to IP ports can be UDP. Channels can be reused depending on size of the data to be transmitted. Data packets can be resent by the sender on receipt of a request from the receiver. This retransmission process will continue until the data is successfully received.

The connection request can support both Unicast and Multicast data transmission. Managed multicast (unicast) can be used if the network apparatus does not support multicast, or it's configured to use managed multicast (unicast). The method implements Layer 7 routing, communication, and load balancing within a Layer 4 network. Data packets are sent with UDP protocol (layer 4) to reduce the network overhead of the layer7 protocols.

A further option includes a data receiving apparatus for receiving data from a sender in an arranged communications group. The apparatus includes a controller a data receiver capable of receiving data, and a data transmitter capable of sending data. The data receiver and the data sender are part of the communication group. The data receiver is configured to receive a connection request from a sender, the connection request including information on the data to be transferred. On receipt of the request the receiver opens a plurality of channels based on information on the data to be transferred. The data sender is configured to send to the data receiver confirmation of the connection request and a plurality of channels to send the data as data packets to. The data receiver is further configured to receive the data packets in parallel at the plurality of channels and to check whether the data was received. The data receiver is also configured to send to the sender confirmation that the data was received or a request to resend data packets to one or more channels.

The data can be transmitted using multicast. The connection request can include a request for secure communication. The connection request can include the information of whether the data is encrypted, and the encryption method is used.

Secure communication can be negotiated on a per data send/receive request as opposed to a per data packet. The data transmitter can encrypt the data before split the data into segments, the data receiver recombined all the data segments into the original data sent before attempting to decrypt the data.

Secure communication can be based on a security receive key and the security receive key is acquired based on receiver group. Multicast security can be achieved with regulated group keys, the group members from the same communication group have a group key assigned. A trusted data transmitter (holds a trusted signed certificate) can get the public group key to encrypt the data. The data receiver can decrypt the received data with the group key (private key).

The data can be secured using a public key for the receiver or the receiver group. data to be sent is encrypted with the public group key of the receiver or the receiver group, encrypted data is decrypted with the group key (private key).

The channels for sending/receiving data packets can be IP ports. The channels can be opened and configured only once upon system start-up and reused throughout the lifetime of the system (i.e., until the system is shut down).

The protocol for sending data packet(s) to IP ports can be UDP, channels can be reused depending on size of the data to be transmitted. Data packets can be resent by the sender on receipt of a request from the receiver. This retransmission process will continue until the data is successfully received.

The connection request can support both Unicast and Multicast data transmission. Managed multicast (unicast) will be using if the network apparatus does not support multicast, or it's configured to use managed multicast (unicast). The apparatus implements Layer 7 routing, communication, and load balancing within a Layer 4 network, to reduce the network overhead of the layer7 protocols.

A number of methods have been described above. Any of these methods may be embodied by a series of instructions which may form a computer program. These instructions, or this computer program, may be stored on a computer-readable medium, which may be non-transitory. When executed, these instructions or this program may cause one or more processors to perform the described methods.

Where an approach has been described as being implemented by a processor, this may comprise a plurality of processors. That is, at least in the case of processors, the singular should be interpreted as including the plural. Where methods comprise multiple steps, different steps or different parts of a step may be performed by different processors.

The order of steps within methods may be altered, such that steps are performed out of order or in parallel, except where one step is dependent on another having been performed, or the context otherwise requires.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A method of transmitting data between a sender and an arranged communications group comprising a receiver group, the method comprising the steps of:
   the sender sending a connection request to at least one receiver of the receiver group, the connection request including information on the data to be transferred, wherein the connection request includes a request for secure communication;
   the sender receiving confirmation of the connection request and a plurality of channels to send the data to;
   generating a plurality of data packets based on the data to be transmitted and the plurality of channels;
   sending in parallel the data to the plurality of channels; and
   receiving confirmation on whether or not the data was received,
   wherein secure communication is based on a security receive key and the security receive key is acquired based on the receiver group and wherein secure communication is negotiated on a per data send/receive request as opposed to a per data packet.

2. The method of claim 1, wherein the data is secured using a public key for the at least one receiver of the receiver group.

3. The method of claim 1, wherein the channels can be reused depending on size of the data to be transmitted.

4. The method of claim 1, wherein data packets are resent by the sender on receipt of a request from the at least one receiver of the receiver group.

5. The method of claim 1, wherein the method implements Layer 7 routing, communication, and load balancing within a Layer 4 network.

6. A data transmission apparatus for transmitting data between a sender and an arranged communications group comprising a receiver group, the apparatus comprising:
 a controller;
 a data transmitter capable of sending data to at least one receiver of the receiver group capable of receiving data;
wherein:
 the data transmitter and the at least one receiver of the receiver group are part of the communication group;
 the data transmitter is configured to send a connection request to at least one receiver of the receiver group, the connection request including information on the data to be transferred, wherein the connection request includes a request for secure communication;
 the data transmitter is configured to receive confirmation of the connection request and a plurality of channels to send the data to;
 the data transmitter is configured to generate a plurality of data packets based on the data to be transmitted and the plurality of channels;
 the data transmitter is further configured to send in parallel the data to the plurality of channels; and
 the data transmitter is further configured to receive confirmation on whether or not the data was received,
wherein secure communication is based on a security receive key and the security receive key is acquired based on the receiver group and wherein secure communication is negotiated on a per data send/receive request as opposed to a per data packet.

7. The data transmission apparatus of claim 6, wherein the data is secured using a public key for the at least one receiver of the receiver group.

8. The data transmission apparatus of claim 6, wherein the apparatus implements Layer 7 routing, communication, and load balancing within a Layer 4 network.

9. The data transmission apparatus of claim 6, wherein the channels can be reused depending on size of the data to be transmitted.

10. The data transmission apparatus of claim 6, wherein data packets are resent by the sender on receipt of a request from the at least one receiver of the receiver group.

11. A method of receiving data at a receiver from a sender, the receiver in an arranged communication group, the method comprising the steps of:
 receiving a connection request from the sender, the connection request including information on the data to be transferred, the connection request including a request for secure communication;
 opening a plurality of channels based on information on the data to be transferred;
 sending to the sender confirmation of the connection request and a plurality of channels to send the data as data packets to;
 receiving the data packets in parallel at the plurality of channels and checking whether the data was received; and
 sending confirmation that the data was received or a request to resend data packets to one or more channels,
 wherein secure communication is based on a security receive key and the security receive key is acquired based on the receiver group and wherein secure communication is negotiated on a per data send/receive request as opposed to a per data packet.

12. The method of claim 11, wherein channels can be reused depending on size of the data to be transmitted.

13. The method of claim 11, wherein data packets are resent by the sender on receipt of a request from the receiver.

14. The method of claim 11, wherein the method implements Layer 7 routing, communication, and load balancing within a Layer 4 network.

15. The method of claim 11, wherein the data is secured using a public key for the at least one receiver or the receiver group.

16. A data receiving apparatus for receiving data from a sender, the data receiving apparatus in an arranged communications group, the data receiving apparatus comprising:
 a controller;
 a data receiver capable of receiving data;
 a data transmitter capable of sending data;
wherein:
 the data receiver and the data sender are part of the communication group;
 the data receiving apparatus is configured to:
 receive a connection request from a sender, the connection request including information on the data to be transferred, the connection request including a request for secure communication; and
 open a plurality of channels based on the information on the data to be transferred;
 send to the data receiver confirmation of the connection request and a plurality of channels to send the data as data packets to;
 the data receiving apparatus is further configured to receive the data packets in parallel at the plurality of channels;
 the data receiving apparatus is configured to check whether the data was received; and
 the data receiving apparatus is configured to send to the data sender confirmation that the data was received or a request to resend data packets to one or more channels,
wherein secure communication is based on a security receive key and the security receive key is acquired based on receiver group and wherein secure communication is negotiated on a per data send/receive request as opposed to a per data packet.

17. The data receiving apparatus of claim 16, wherein the data is secured using a public key for the data receiving apparatus or the receiver group.

18. The data receiving apparatus of claim 16, wherein the channels can be reused depending on size of the data to be transmitted.

19. The data receiving apparatus of claim 16, wherein data packets are resent by the sender on receipt of a request from the data receiving apparatus.

20. The data receiving apparatus of claim 16, wherein the apparatus implements Layer 7 routing, communication, and load balancing within a Layer 4 network.

* * * * *